United States Patent
Matsui et al.

(10) Patent No.: US 10,623,172 B2
(45) Date of Patent: Apr. 14, 2020

(54) CONTROL SIGNAL TRANSMISSION AND RECEPTION SYSTEM AND CONTROL SIGNAL TRANSMISSION AND RECEPTION METHOD

(71) Applicant: FUJITSU LIMITED, Kawasaki-shi, Kanagawa (JP)

(72) Inventors: Jun Matsui, Kawasaki (JP); Hisakatsu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/520,431

(22) Filed: Jul. 24, 2019

(65) Prior Publication Data
US 2020/0036507 A1    Jan. 30, 2020

(30) Foreign Application Priority Data
Jul. 25, 2018  (JP) .................................. 2018-139520

(51) Int. Cl.
*H04L 7/027*    (2006.01)
*H04L 7/033*    (2006.01)
*H04L 7/00*     (2006.01)

(52) U.S. Cl.
CPC ............ *H04L 7/027* (2013.01); *H04L 7/0337* (2013.01); *H04L 7/0025* (2013.01)

(58) Field of Classification Search
CPC ......... H04L 7/033; H04L 1/205; H04L 7/027; H04L 7/0337; H04L 7/025
See application file for complete search history.

(56) References Cited

U.S. PATENT DOCUMENTS

2005/0032491 A1* 2/2005 Carballo ................ H04B 17/20
                                                     455/135

FOREIGN PATENT DOCUMENTS

JP       05-037311       2/1993
JP       05-284129      10/1993

* cited by examiner

*Primary Examiner* — Rahel Guarino
(74) *Attorney, Agent, or Firm* — Fujitsu Patent Center (57) ABSTRACT

A method includes transmitting a data signal generated by adjusting a phase of a data signal, receiving a control signal having a frequency lower than that of the data signal and used to control an apparatus of a transmission destination of the data signal, and applying, in a case where a signal level of the control signal is a level, jitter to the data signal by periodically changing a magnitude of an additional phase code to be added to a phase code representative of an adjustment amount for the phase but fixing, in a case where the signal level is a level different from the level, the additional phase code to 0, receiving the data signal and adjusting a phase of the data signal to generate a data signal and restoring the control signal from a phase code representative of an adjustment amount for the phase.

8 Claims, 9 Drawing Sheets

CONTROL SIGNAL TRANSMISSION AND RECEPTION SYSTEM AND CONTROL SIGNAL TRANSMISSION AND RECEPTION METHOD

CROSS-REFERENCE TO RELATED APPLICATION

This application is based upon and claims the benefit of priority of the prior Japanese Patent Application No. 2018-139520, filed on Jul. 25, 2018, the entire contents of which are incorporated herein by reference.

FIELD

The embodiments discussed herein relate to a control signal transmission and reception system and a control signal transmission and reception method.

BACKGROUND

A controller that manages communication modules that perform transmission and reception of data in one apparatus controls such port configurations as change and so forth of transmission parameters and operation channels.

Meanwhile, in the case where transmission and reception of a data signal are to be performed between a plurality of apparatuses, a method is available in which a different management apparatus transmits control signals for such control as described above in parallel to each other to communication modules in the individual apparatuses. Further, a different method is available in which transmission and reception of a control signal are performed between apparatuses using a communication line different from a communication line that is used for transmission and reception of a data signal.

However, since the methods described above increase the number of communication lines between apparatuses, this leads to increase in the mounting area and the cost. Thus, a method is available in which a control signal is transmitted at a timing different from that of a data signal using a communication line that is used for transmission and reception of a data signal.

Examples of the related art include Japanese Laid-open Patent Publication No. 05-284129.

However, the method in which a control signal is transmitted at a timing different from that of a data signal using a communication line that is used for transmission and reception of a data signal has a problem that a delay in transmission and reception of a data signal is caused by a transmission period of a control signal.

Taking the foregoing into consideration, it is an object of the present technology to provide a control signal transmission and reception system and a control signal transmission and reception method by which a control signal may be transmitted and received without causing a delay in transmission and reception of a data signal.

SUMMARY

According to an aspect of the embodiments, a method includes transmitting a data signal generated by adjusting a phase of a data signal, receiving a control signal having a frequency lower than that of the data signal and used to control an apparatus of a transmission destination of the data signal, and applying, in a case where a signal level of the control signal is a level, jitter to the data signal by periodically changing a magnitude of an additional phase code to be added to a phase code representative of an adjustment amount for the phase but fixing, in a case where the signal level is a level different from the level, the additional phase code to 0, receiving the data signal and adjusting a phase of the data signal to generate a data signal and restoring the control signal from a phase code representative of an adjustment amount for the phase.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the following, embodiments that carry out the present technology are described with reference to the drawings.

First Embodiment

Figure 1:
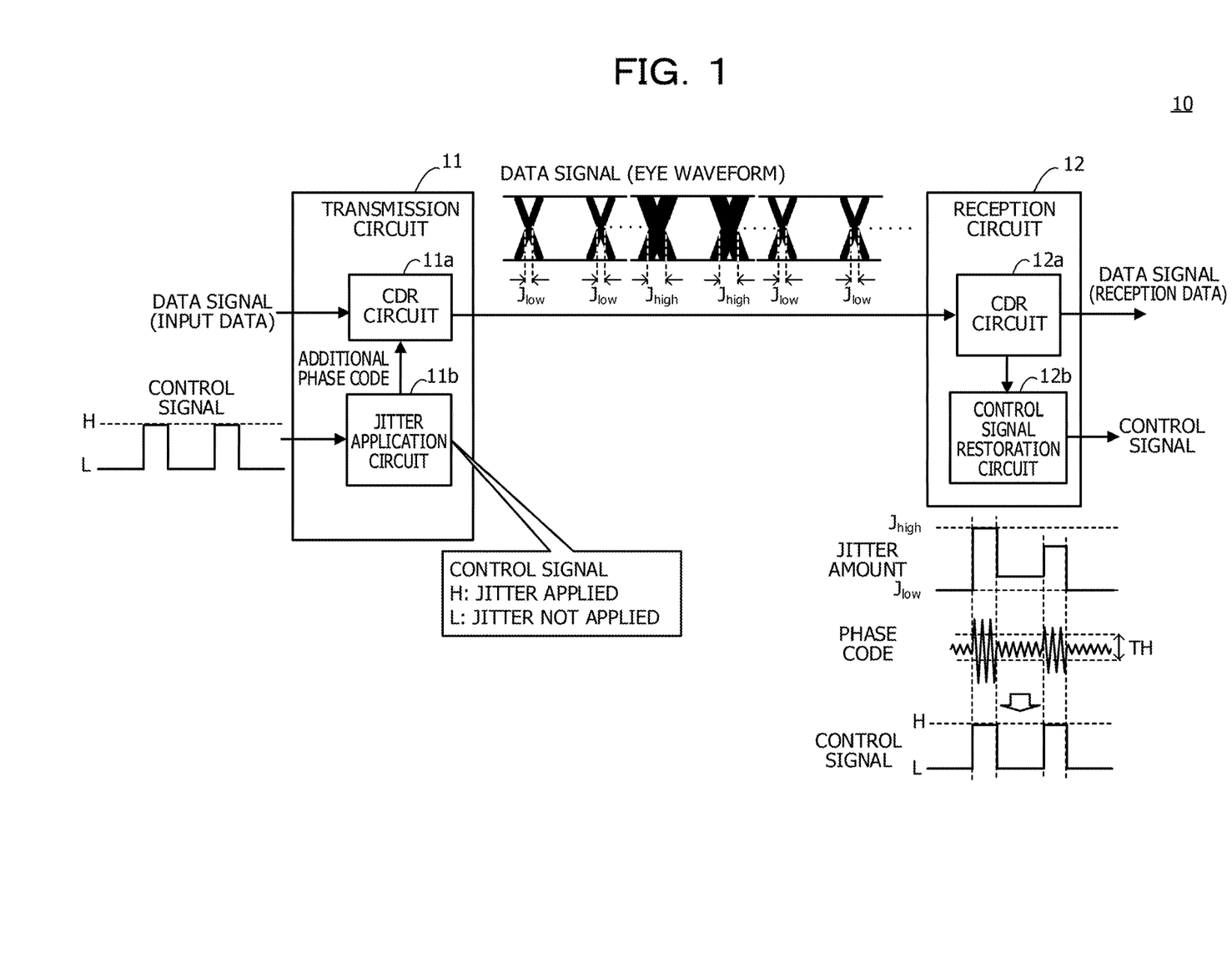
FIG. 1 depicts an example of a control signal transmission and reception system of a first embodiment.

FIG. 1 is a view depicting an example of a control signal transmission and reception system of a first embodiment.

A control signal transmission and reception system 10 is a system in which a control signal is transmitted and received together with a data signal, for example, between different apparatuses. The control signal is a signal, for example, for changing transmission parameters or an operation channel of communication modules and is lower in frequency than a data signal. For example, in the case where the frequency of a data signal is 25 GHz, the frequency of a control signal is 100 kHz, 1 GHz or the like.

The control signal transmission and reception system 10 includes a transmission circuit 11 and a reception circuit 12.

The transmission circuit 11 includes a clock data recovery (CDR) circuit 11a and a jitter application circuit 11b. The CDR circuit 11a adjusts the phase of a data signal inputted thereto (input data). Then, the CDR circuit 11a transmits a data signal generated through phase adjustment. The jitter application circuit 11b receives a control signal for controlling an apparatus of a transmission destination of the data signal. Then, in the case where the signal level of the control signal is one of the high (H) level and the low (L) level, the jitter application circuit 11b periodically changes the magnitude of an additional phase code to be added to a phase code representative of an adjustment amount of the phase for input data. This applies jitter to the data signal to be transmitted. In the case where the signal level of the control signal is the other of the H level and the L level, the jitter application circuit 11b fixes the additional phase code to 0. In this case, jitter by the additional phase code is not applied to the data signal to be transmitted.

In the following description, it is assumed that, in the case where the signal level of the control signal has the H level (for example, the power supply voltage level), the jitter application circuit 11b adds an additional phase code that periodically changes to the phase code, but in the case where the signal level has the L level (for example, 0 V), the jitter application circuit 11b fixes the additional phase code to 0.

It is to be noted that, in order to make it possible for the frequency of the additional phase code, which periodically varies in magnitude, to represent a variation of the control signal, preferably the frequency is higher than the frequency of the control signal but is sufficiently lower than the frequency of input data such that phase adjustment for input data is not disturbed. Further, if the amplitude of the additional phase code is excessively great, the maximum amount of jitter becomes excessively great, and therefore, the amplitude is set appropriately within a range within which normal data communication may be performed.

The reception circuit 12 includes a CDR circuit 12a and a control signal restoration circuit 12b. The CDR circuit 12a receives a data signal and adjusts the phase of the received data signal to generate reception data. The control signal restoration circuit 12b restores a control signal from a phase code representative of an adjustment amount for the phase of the received data signal.

In the following, an example of operation of the control signal transmission and reception system 10 of the first embodiment is described.

As depicted in FIG. 1, a control signal of a pulse waveform is inputted to the transmission circuit 11 together with input data. When the signal level of the control signal is the H level, the jitter application circuit 11b adds an additional phase code, which periodically varies in magnitude, to a phase code. Consequently, jitter by the additional phase code is applied to a data signal to be transmitted from the CDR circuit 11a. On the other hand, when the signal level of the control signal is the L level, the jitter application circuit 11b fixes the additional phase code to 0. Consequently, jitter by the additional phase code is not applied to the data signal to be transmitted from the CDR circuit 11a.

In FIG. 1, an example of an eye waveform of a data signal transmitted from the transmission circuit 11 is depicted. The jitter amount when jitter by the additional phase code is applied is $J_{high}$, and the jitter amount when jitter by the additional phase code is not applied (jitter amount by jitter arising from the circuit or the transmission line) is greater than $J_{low}$.

In the reception circuit 12, the CDR circuit 12a receives a data signal and generates reception data by adjusting the phase of the received data signal. The control signal restoration circuit 12b restores the control signal from the phase code representative of an adjustment amount of the phase of the received data signal.

For example, the phase code when the jitter amount is $J_{high}$ is greater in amplitude than the phase code when the jitter amount is $J_{low}$. The control signal restoration circuit 12b decides that jitter by an additional phase code is applied in the case where, for example, the amplitude of the phase code is equal to or greater than a threshold value TH as depicted in FIG. 1. Then, the control signal restoration circuit 12b generates a control signal whose signal level is the H level for a period for which it decides that jitter by an additional phase code is applied. On the other hand, when the amplitude of the phase code is smaller than the threshold value TH, the control signal restoration circuit 12b decides that jitter by an additional phase code is not applied and generates a control signal whose signal level at the time is set to the L level.

As described above, in the control signal transmission and reception system 10 of the first embodiment, a control signal is added as a jitter amount variation to a data signal Ds to be transmitted depending upon whether or not an additional phase code that periodically varies in magnitude is to be added to a phase code of the CDR circuit 11a. Consequently, different from the method by which a control signal is transmitted at a timing different from that of a data signal, no delay occurs with transmission and reception of a data signal. For example, a control signal may be transmitted and received without delaying transmission and reception of a data signal.

Further, since a control signal may be transmitted and received by a communication line same as that for a data signal, increase of the number of communication lines between apparatuses may be suppressed. Consequently, increase of the installation area may be suppressed and reduction in cost of the control signal transmission and reception system 10 may be anticipated.

Further, the transmission circuit 11 may transmit a control signal together with a data signal only by adding such a jitter application circuit 11b as described above to an existing transmission circuit having a CDR function. Further, the reception circuit 12 may restore a control signal only by addition such a control signal restoration circuit 12b as described above to an existing reception circuit having a CDR function. Since the jitter application circuit 11b and the control signal restoration circuit 12b may be implemented from a circuit of a comparatively small scale, increase of the circuit scale of the transmission circuit 11 and the reception circuit 12 may be suppressed.

Second Embodiment

Figure 2:
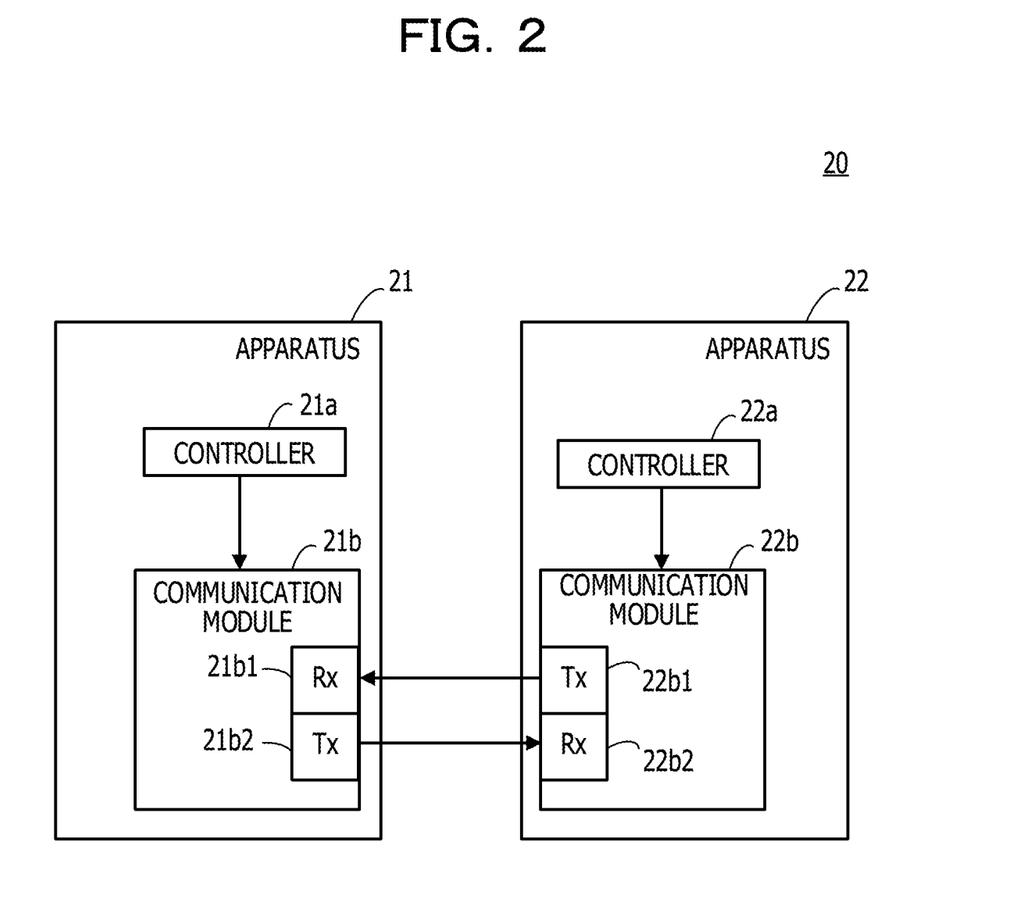
FIG. 2 depicts an example of a control signal transmission and reception system of a second embodiment.

FIG. 2 is a view depicting an example of a control signal transmission and reception system of a second embodiment.

A control signal transmission and reception system 20 of the second embodiment includes apparatuses 21 and 22 that perform communication. The apparatus 21 includes a controller 21a and a communication module 21b, and also the apparatus 22 includes a controller 22a and a communication module 22b.

The controller 21a causes the communication module 21b to transmit a control signal, for example, for performing changing of transmission parameters and an operation channel of the communication module 22b. The controller 22a causes the communication module 22b to transmit a control signal, for example, for performing changing of transmission parameters and an operation channel of the communication module 21b.

The communication module 21b includes a reception circuit 21b1 and a transmission circuit 21b2. Also the communication module 22b includes a transmission circuit 22b1 and a reception circuit 22b2.

The reception circuits 21b1 and 22b2 and the transmission circuits 21b2 and 22b1 have a CDR function and may transmit or receive a data signal and a control signal at the same time as hereinafter described.

It is to be noted that the apparatuses 21 and 22 may include other circuit modules in addition to the communication modules 21b and 22b.

Figure 3:
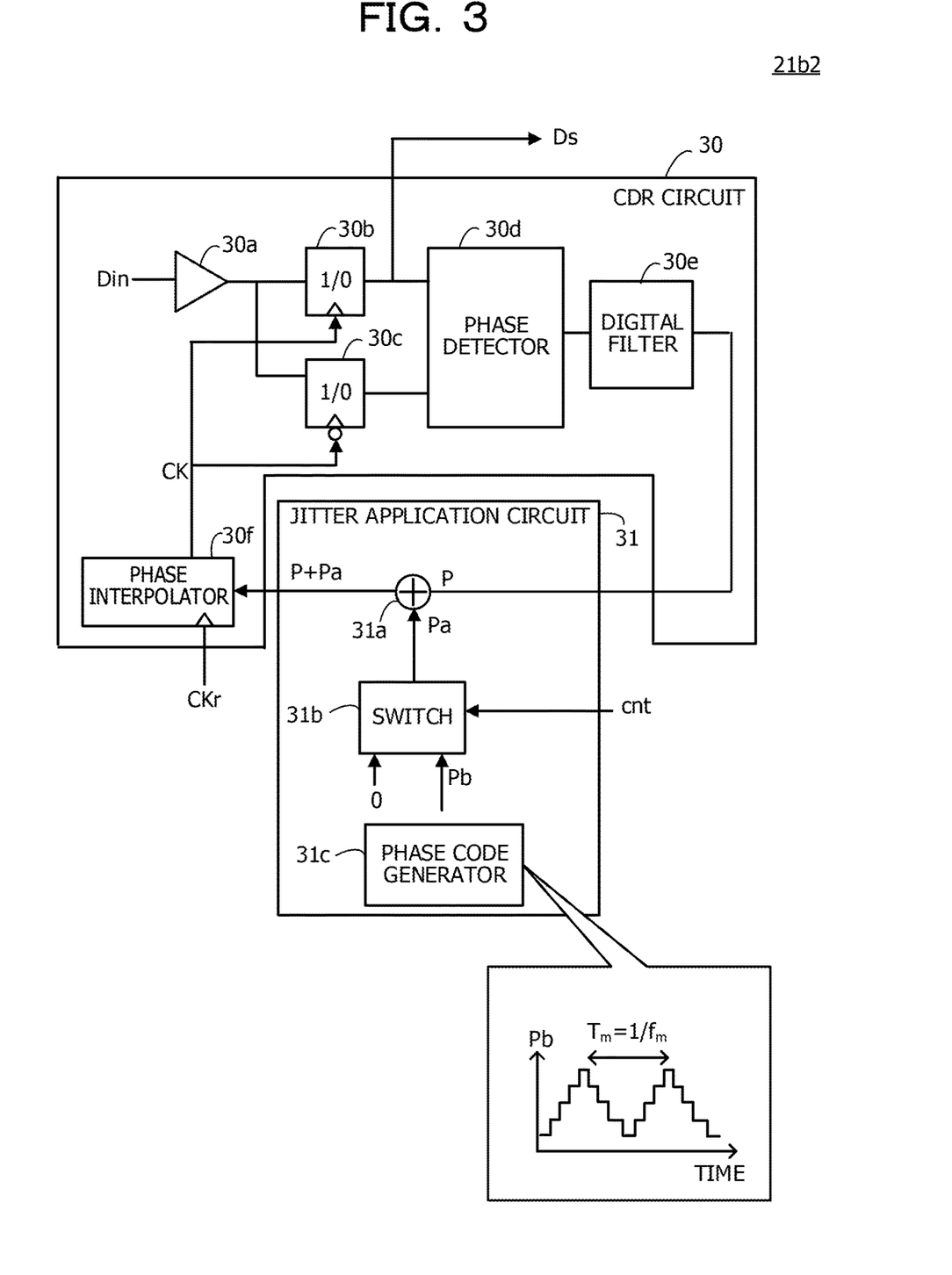
FIG. 3 depicts an example of a transmission circuit.

FIG. 3 is a view depicting an example of a transmission circuit. Although an example of the transmission circuit 21b2 depicted in FIG. 2 is depicted in FIG. 3, also the transmission circuit 22b1 has a similar circuit configuration.

The transmission circuit 21b2 includes a CDR circuit 30 and a jitter application circuit 31.

The CDR circuit 30 includes, for example, as depicted in FIG. 3, an amplifier 30a, a data decision circuit 30b, a phase decision circuit 30c, a phase detector 30d, a digital filter 30e, and a phase interpolator 30f.

The amplifier 30a amplifies input data Din. The input data Din is, for example, data generated in the communication module 21b or data inputted from a different circuit module.

The data decision circuit 30b generates a data signal Ds (transmission data) having a signal level of 0 (L level) or 1 (H level) based on the magnitude of an output signal of the amplifier 30a at a timing of a rising edge of a clock signal CK supplied from the phase interpolator 30f.

The phase decision circuit 30c outputs the signal of 1 or 0 based on the magnitude of the output signal of the amplifier 30a at a timing of a lowering edge of the clock signal CK.

The phase detector 30d outputs a signal representative of a phase difference between the data signal Ds and the clock signal CK based on the data signal Ds and an output signal of the phase decision circuit 30c.

The digital filter 30e filters the signal outputted from the phase detector 30d and indicative of a phase different and outputs a phase code P of a digital value.

The phase interpolator 30f generates a clock signal CK by adjusting the phase of a reference clock CKr with a phase adjustment amount based on a code P+Pa obtained by adding the additional phase code Pa to the phase code P.

The jitter application circuit 31 includes an adder 31a, a switch 31b, and a phase code generator 31c.

The adder 31a adds an additional phase code Pa to a phase code P.

The switch 31b outputs one of a phase code Pb whose magnitude varies periodically and the fixed value "0" as the additional phase code Pa in response to the signal level of a control signal cnt. In the following description, it is assumed that, in the case where the signal level of the control signal cnt is the H level, the switch 31b outputs a phase code Pb as the additional phase code Pa, but in the case where the signal level of the control signal cnt is the L level, the switch 31b outputs the fixed value "0" as the additional phase code Pa.

The phase code generator 31c generates a phase code Pb that periodically varies in magnitude. The phase code generator 31c is a sine wave generator that generates a phase code Pb of a sine waveform, for example, of a frequency $f_m$ (cycle $T_m=1/f_m$). The frequency $f_m$ preferably is higher than the frequency of the control signal such that a variation of the signal level of the control signal cnt may be represented but is sufficiently lower than the frequency of input data Din such that phase adjustment of the input data Din is not disturbed too much. Further, if the amplitude of the phase code Pb is excessively great, the maximum amount of jitter becomes excessively great, and therefore, the amplitude of the phase code Pb is set suitably within a range within which normal data communication may be performed.

In such a transmission circuit 21b2 as described above, when the signal level of the control signal cnt is the H level, a phase code Pb having the frequency $f_m$ and a varying magnitude is added as the additional phase code Pa to the phase code P. Therefore, jitter based on the phase code Pb is applied to the data signal Ds. On the other hand, when the signal level of the control signal cnt is the L level, since the additional phase code Pa is fixed to 0, jitter based on the phase code Pb is not applied to the data signal Ds.

Figure 4:
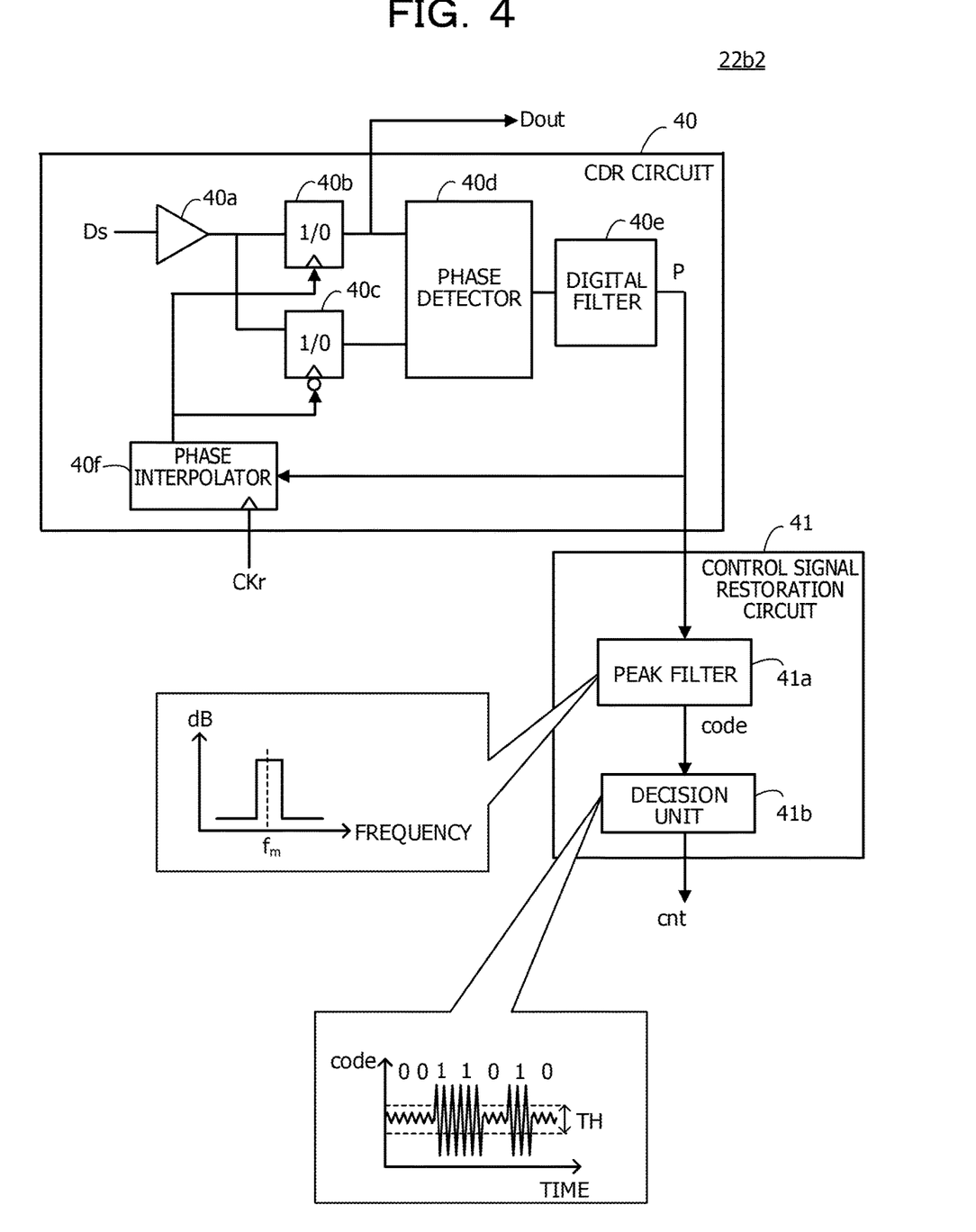
FIG. 4 depicts an example of a reception circuit.

FIG. 4 is a view depicting an example of a reception circuit. Although an example of the reception circuit 22b2 depicted in FIG. 2 is depicted in FIG. 4, also the reception circuit 21b1 has a similar circuit configuration.

The reception circuit 22b2 includes a CDR circuit 40 and a control signal restoration circuit 41.

The CDR circuit 40 includes an amplifier 40a, a data decision circuit 40b, a phase decision circuit 40c, a phase detector 40d, a digital filter 40e, and a phase interpolator 40f similarly to the CDR circuit 30 of the transmission circuit 21b2.

Although the components of the CDR circuit 40 have functions same as those of the components of the CDR circuit 30, the amplifier 40a amplifies a data signal Ds transmitted from the transmission circuit 21b2, and the data decision circuit 40b outputs reception data Dout. Further, a phase code P outputted from the digital filter 40e is supplied to the phase interpolator 40f and is supplied to the control signal restoration circuit 41.

The control signal restoration circuit 41 extracts, from the phase code P, a component that varies in the frequency $f_m$ described hereinabove and restores the control signal based on a result of comparison between the extracted component and a given threshold value. The control signal restoration circuit 41 includes a peak filter 41a and a decision unit 41b.

The peak filter 41a extracts, from the phase code P, a component that varies in the frequency $f_m$. In FIG. 4, an example of a characteristic of the peak filter 41a is depicted. The axis of abscissa indicates the frequency, and the axis of ordinate indicates the decibel (dB). Components other than those in a frequency band around the frequency $f_m$ are cut.

The decision unit 41b restores the control signal cnt based on a result of comparison between the amplitude of an output signal code (extracted component) of the peak filter 41a and a threshold value. The decision unit 41b performs the comparison, for example, in a cycle of the control signal cnt. Then, the decision unit 41b restores the control signal cnt by outputting 1 in the case where the amplitude of the output signal code of the peak filter 41a is equal to or greater than the threshold value TH but outputting 0 in the case where the amplitude is smaller than the threshold value TH as depicted in FIG. 4.

Figure 5:
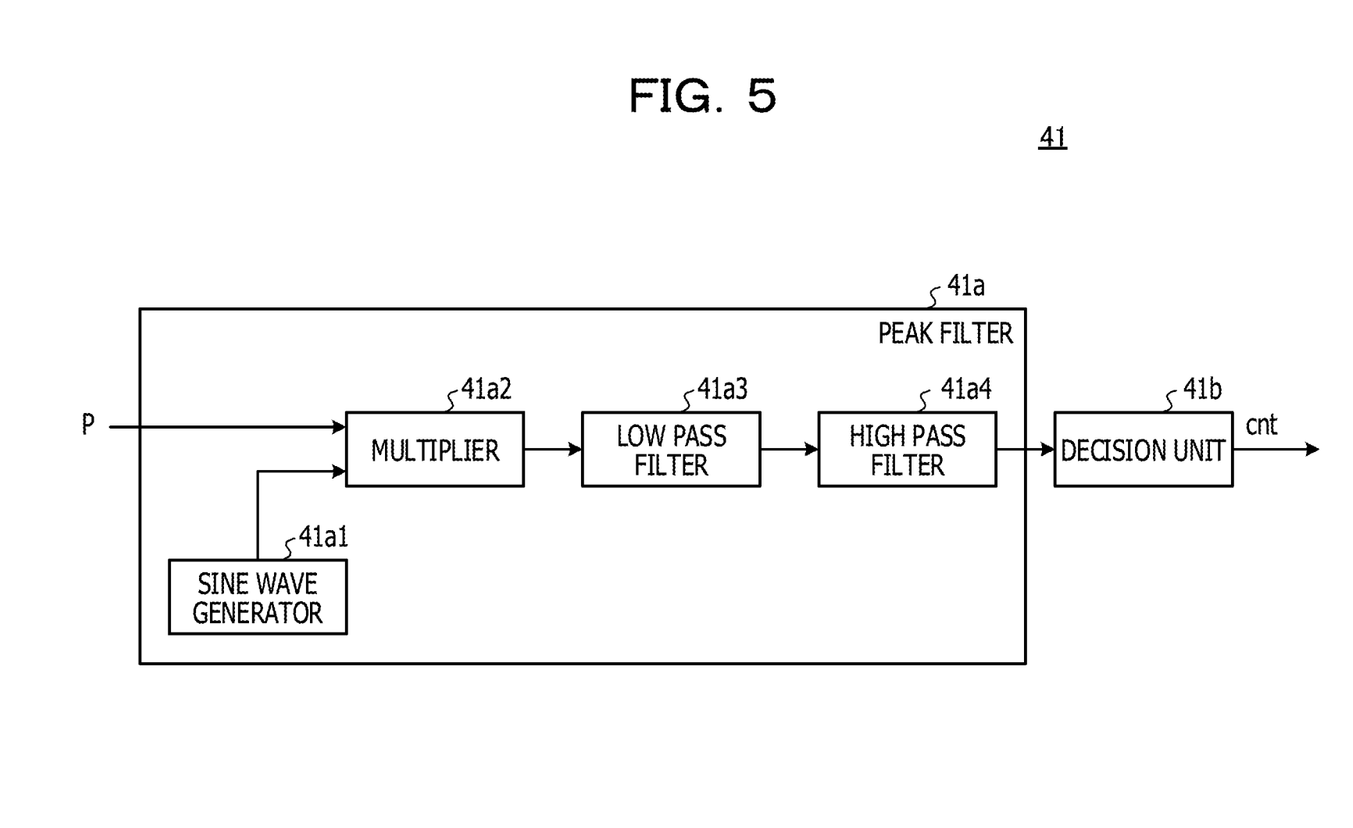
FIG. 5 depicts an example of a peak filter.

FIG. 5 is a view depicting an example of a peak filter.

The peak filter 41a includes a sine wave generator 41a1, a multiplier 41a2, a low pass filter 41a3, and a high pass filter 41a4.

The sine wave generator 41a1 generates a sine wave of the frequency $f_m$.

The multiplier 41a2 outputs a result of multiplication of the phase code P and the sine wave described above.

The low pass filter 41a3 cuts, from among frequency components of a result of the multiplication outputted from the multiplier 41a2, frequency components higher than the frequency $f_m$.

The high pass filter 41a4 cuts, from among the frequency components of the result of the multiplication outputted from the multiplier 41a2, frequency components lower than the frequency $f_m$.

Figure 6:
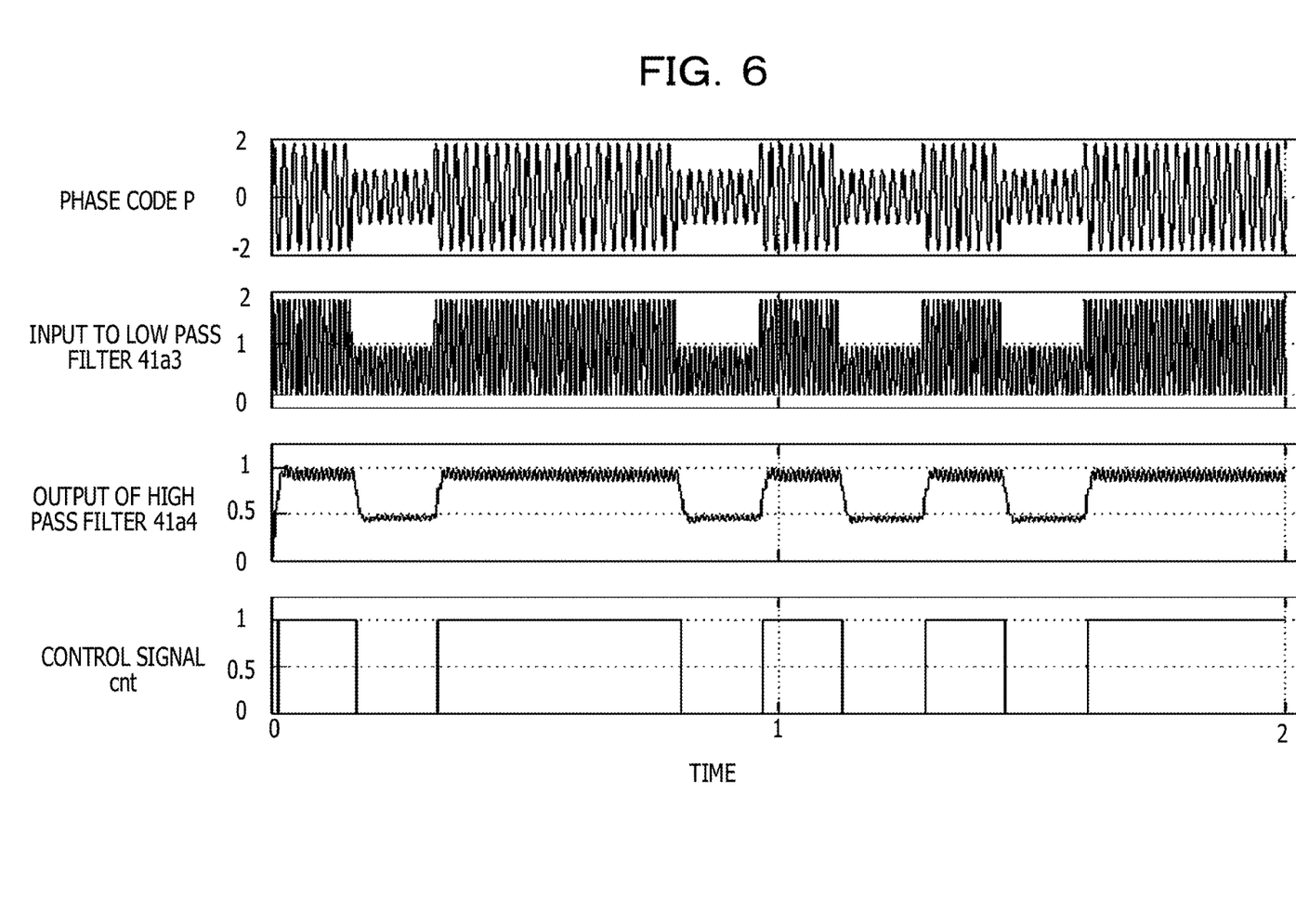
FIG. 6 depicts an example of restoration of a control signal by a control signal restoration circuit.

FIG. 6 is a view depicting an example of restoration of a control signal by a control signal restoration circuit. In FIG. 6, an example of a time variation of the phase code P, an input to the low pass filter 41a3, an output of the high pass filter 41a4, and the control signal cnt is depicted.

In the example of FIG. 6, in the case where the output (output signal code) of the high pass filter 41a4 is equal to or higher than 0.5, the decision unit 41b outputs 1 as the control signal cnt, but in the case where the output is lower than 0.5, the decision unit 41b outputs 0 as the control signal cnt.

In such a control signal transmission and reception system 20 of the second embodiment as described above, a control signal cnt is transmitted depending upon presence or absence of application of jitter to the data signal Ds by the phase code Pb that varies in magnitude in the frequency $f_m$. Consequently, different from the method by which the control signal cnt is transmitted at a timing different from that of the data signal Ds, no delay occurs with transmission and reception of the data signal Ds. For example, the control signal cnt may be transmitted and received without delaying the transmission and reception of the data signal Ds.

Further, since the control signal cnt may be transmitted and received by a communication line same as that for the data signal Ds, increase of the number of communication lines between the apparatuses 21 and 22 may be suppressed.

Further, the transmission circuit 21b2 may transmit the control signal cnt together with the data signal Ds only by adding such a jitter application circuit 31 as described above to an existing transmission circuit having a CDR function. Further, the reception circuit 22b2 may restore the control signal cnt only by adding such a control signal restoration circuit 41 as described above to an existing reception circuit having a CDR function. Since the jitter application circuit 31 and the control signal restoration circuit 41 may be implemented by a circuit of a comparatively small scale, increase of the circuit scale of the transmission circuit 21b2 and the reception circuit 22b2 may be suppressed.

Further, the control signal restoration circuit 41 of the reception circuit 22b2 extracts a component that varies in the frequency $f_m$ from the phase code P and decides whether or not jitter by the phase code Pb is applied to the data signal Ds based on a result of comparison between the extracted component and a given threshold value. Consequently, it may be decided with high accuracy without being disturbed by other frequency components of the phase code P whether or not jitter by the phase code Pb is applied to the data signal Ds, and the restoration accuracy of the control signal cnt may be increased.

Third Embodiment

Figure 7:
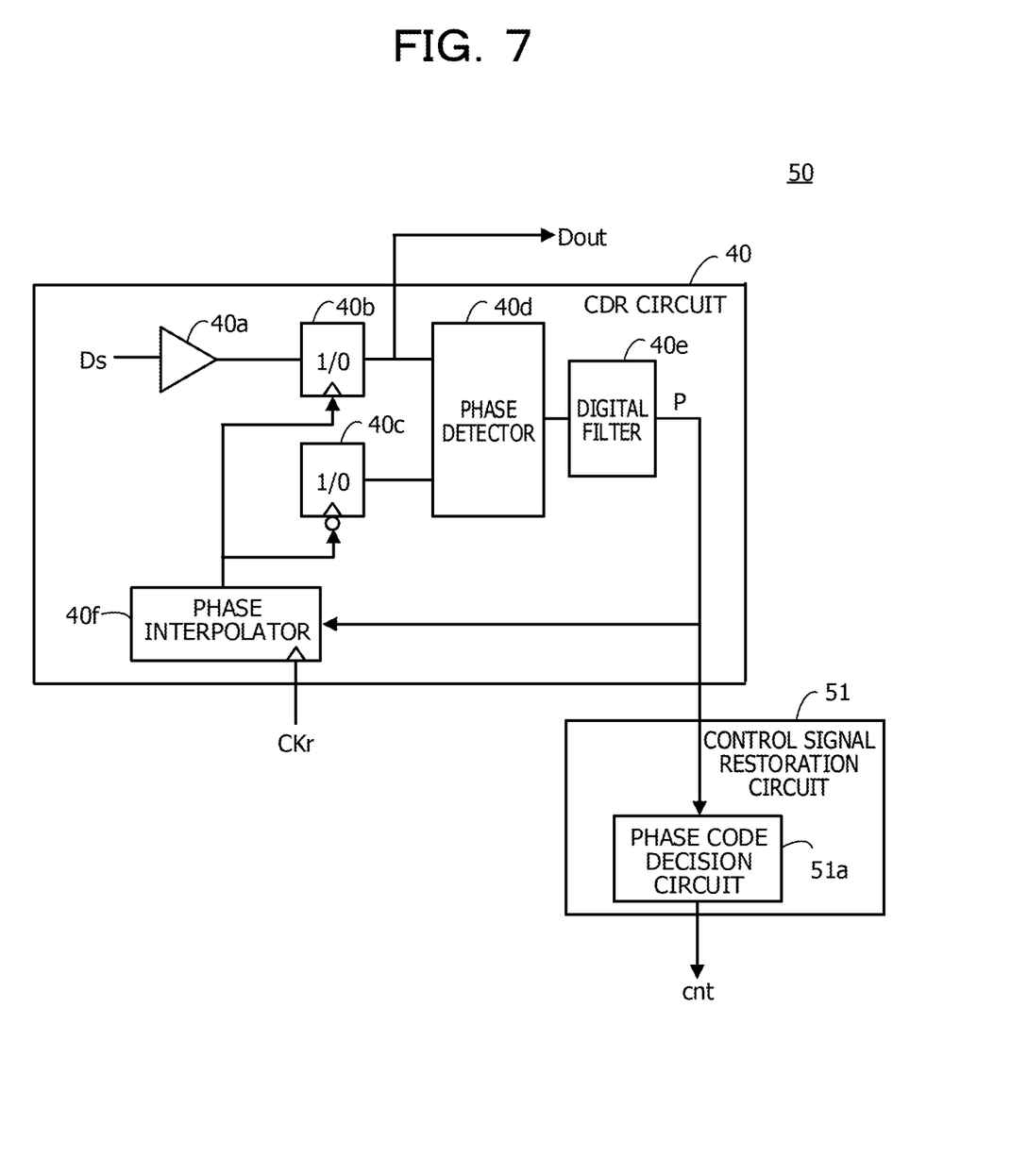
FIG. 7 depicts an example of a reception circuit in a control signal transmission and reception system of a third embodiment.

FIG. 7 is a view depicting an example of a reception circuit in a control signal transmission and reception system of a third embodiment. A transmission circuit of the control signal transmission and reception system of the third embodiment is same as the transmission circuit 21b2 of the control signal transmission and reception system 20 of the second embodiment.

In a reception circuit 50 in the control signal transmission and reception system of the third embodiment, elements same as those of the reception circuit 22b2 (in the CDR circuit 40) depicted in FIG. 4 are denoted by the same reference symbols. In the reception circuit 50, a control signal restoration circuit 51 is different from the control signal restoration circuit 41 of the reception circuit 22b2.

The control signal restoration circuit 51 includes a phase code decision circuit 51a that restores a control signal cnt based on a result of comparison between the amplitude of the phase code P and a threshold value.

Figure 8:
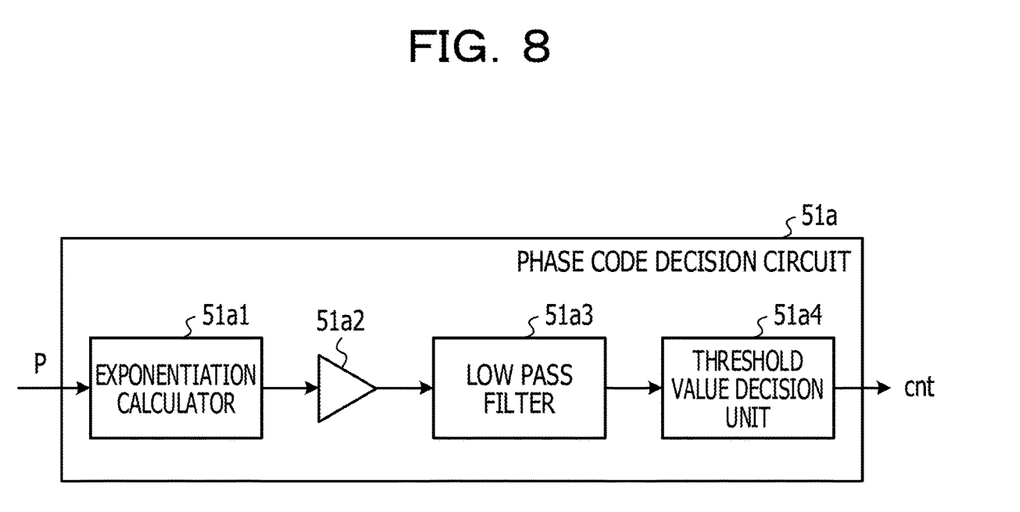
FIG. 8 depicts an example of a phase code decision circuit.

FIG. 8 is a view depicting an example of a phase code decision circuit.

The phase code decision circuit 51a includes an exponentiation calculator 51a1, an amplifier 51a2, a low pass filter 51a3, and a threshold value decision unit 51a4.

The exponentiation calculator 51a1 calculates the square of the phase code P.

The amplifier 51a2 amplifies an output signal of the exponentiation calculator 51a1.

The low pass filter 51a3 cuts high frequency components of an output signal of the amplifier 51a2 (for example, components corresponding to a frequency of the data signal Ds).

The threshold value decision unit 51a4 restores a control signal cnt based on a result of comparison between an output signal of the low pass filter 51a3 and a threshold value. The threshold value decision unit 51a4 performs the comparison described above, for example, in a cycle of the control signal cnt. Then, the threshold value decision unit 51a4 restores the control signal cnt by outputting 1 in the case where the output signal of the low pass filter 51a3 is greater than the threshold value but outputting 0 in the case where the output signal of the low pass filter 51a3 is equal to or smaller than the threshold value.

Figure 9:
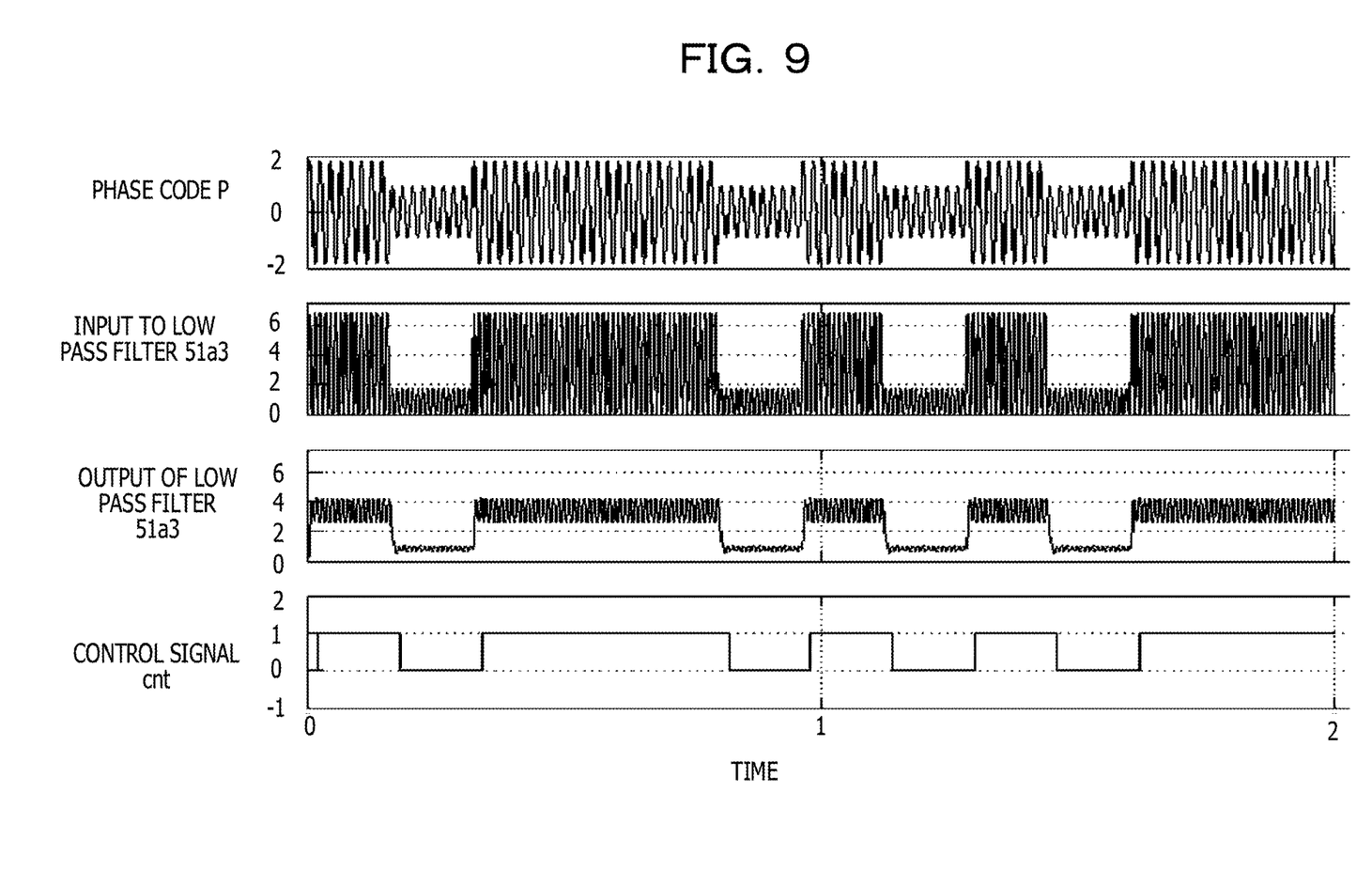
FIG. 9 depicts an example of restoration of a control signal by a control signal restoration circuit in a control signal transmission and reception system of the third embodiment.

FIG. 9 is a view depicting an example of restoration of a control signal by a control signal restoration circuit in a control signal transmission and reception system of the third embodiment. In FIG. 9, an example of a time variation of the phase code P, an input to the low pass filter 51a3, an output of the low pass filter 51a3, and the control signal cnt is depicted.

In the example of FIG. 9, in the case where the output of the low pass filter 51a3 is, for example, equal to or greater than 2, the decision unit 41b outputs 1 as the control signal cnt, but in the case where the output of the low pass filter 51a3 is smaller than 2, the decision unit 41b outputs 0 as the control signal cnt.

Also in the control signal transmission and reception system of the third embodiment that includes such a control signal restoration circuit 51 as described above, the control signal cnt may be transmitted and received without delaying transmission and reception of the data signal Ds similarly as in the control signal transmission and reception system 20 of the second embodiment.

Further, since such a control signal restoration circuit 51 as described above has a configuration simplified from that of the control signal restoration circuit 41 depicted in FIG. 5, the circuit scale of the reception circuit 50 may be made smaller than that of the reception circuits 21b1 and 22b2 of the control signal transmission and reception system 20 of the second embodiment.

Although one point of view of the control signal transmission and reception system and the control signal transmission and reception method of the present technology has been described based on the embodiments, they are mere examples and the present technology is not limited to them.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control signal transmission and reception system, comprising:
    a transmission circuit including
    a first clock data recovery circuit configured to transmit a second data signal generated by adjusting a first phase of a first data signal inputted thereto, and
    a jitter application circuit configured to receive a control signal having a frequency lower than that of the first data signal and used to control an apparatus of a transmission destination of the second data signal, the jitter application circuit being operable to apply, in a case where a signal level of the control signal is a first level, jitter to the second data signal by periodically changing a magnitude of an additional phase code to be added to a first phase code representative of an adjustment amount for the first phase but fix, in a case where the signal level is a second level different from the first level, the additional phase code to 0; and
    a reception circuit including
    a second clock data recovery circuit configured to receive the second data signal and adjust a second phase of the second data signal to generate a third data signal, and
    a control signal restoration circuit configured to restore the control signal from a second phase code representative of an adjustment amount for the second phase.

2. The control signal transmission and reception system according to claim 1, wherein,
    in the case where the signal level of the control signal is the first level, the jitter application circuit varies the magnitude of the additional phase code in accordance with a sine wave of a given frequency.

3. The control signal transmission and reception system according to claim 2, wherein
    the control signal restoration circuit extracts a component that varies in the given frequency from the second phase code and restores the control signal based on a result of comparison between the component and a threshold value.

4. The control signal transmission and reception system according to claim 2, wherein
    the control signal restoration circuit restores the control signal based on a result of comparison between an amplitude of the second phase code and a threshold value.

5. A control signal transmission and reception method, comprising:
    transmitting a second data signal generated by adjusting a first phase of a first data signal;
    receiving a control signal having a frequency lower than that of the first data signal and used to control an apparatus of a transmission destination of the second data signal, and applying, in a case where a signal level of the control signal is a first level, jitter to the second data signal by periodically changing a magnitude of an additional phase code to be added to a first phase code representative of an adjustment amount for the first phase but fixing, in a case where the signal level is a second level different from the first level, the additional phase code to 0;
    receiving the second data signal and adjusting a second phase of the second data signal to generate a third data signal; and
    restoring the control signal from a second phase code representative of an adjustment amount for the second phase.

6. The control signal transmission and reception method according to claim 5, wherein
    the process of applying jitter to the second data signal varies, in the case where the signal level of the control signal is the first level, the magnitude of the additional phase code in accordance with a sine wave of a given frequency.

7. The control signal transmission and reception method according to claim 6, wherein
    the process of restoring the control signal extracts a component that varies in the given frequency from the second phase code and restores the control signal based on a result of comparison between the component and a threshold value.

8. The control signal transmission and reception method according to claim 6, wherein
    the process of restoring the control signal restores the control signal based on a result of comparison between an amplitude of the second phase code and a threshold value.

* * * * *